July 14, 1953  H. E. HULL  2,645,260
BUCKSAW FRAME
Filed Oct. 22, 1949  2 Sheets-Sheet 1
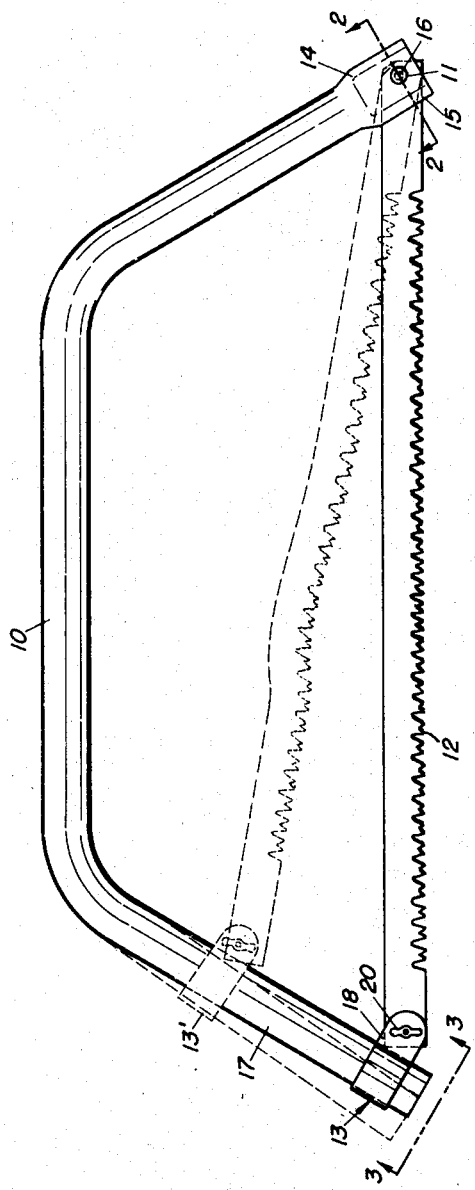
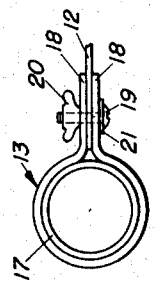
INVENTOR.
Henry E. Hull
BY Adams, Stevens & Mase
AGENTS.

July 14, 1953  H. E. HULL  2,645,260
BUCKSAW FRAME

Filed Oct. 22, 1949  2 Sheets-Sheet 2

INVENTOR.
Henry E. Hull

BY Adams, Stevens & Moss

AGENTS.

Patented July 14, 1953

UNITED STATES PATENT OFFICE 2,645,260

BUCKSAW FRAME

Henry E. Hull, Worthington, Ohio, assignor, by mesne assignments, to Rockwell Tools, Inc., Columbus, Ohio, a corporation of Ohio Application October 22, 1949, Serial No. 122,940

1 Claim. (Cl. 145—33)

This invention relates to a pulpwood or buck saw, and more particularly to a pulpwood or buck saw having a clamp to fasten the saw blade to the frame.

In saws presently in use shouldered pins are provided to fasten the saw blade to the frame. In assembling such saws it is necessary to forcibly flex the frame to insert or remove these pins. As a result a certain amount of strength and skill is required in changing the saw blades.

In another prior art device loops were provided at each end of the saw blade, and were slipped over the ends of the frame and held in place by stop bolts. This type of saw also had the disadvantage of requiring force to flex the frame when assembling the saw. In addition it was necessary to form the special loops and attach them to each blade used with the saw. As a consequence, replacement of a saw blade was not possible without specially prepared elements.

The object of this invention is to provide a saw in which a blade can be easily inserted or removed. A further object is the provision for the release of tension when the saw is not in use.

With these and other objects in view the invention embodies a clamp slidably mounted on a flexible saw frame and an adjustable fastener for connecting a saw blade to the clamp and for tightening the clamp to prevent movement along the frame. The opposite end of the saw blade may be fastened to a similar clamp or may be fastened to the frame by a chamfered pin or other pivotal connection.

For a better understanding of the invention, reference is made to the accompanying drawings in which like reference characters are used to denote corresponding parts.

Figure 1 is a side elevation of an assembled saw showing the relative positions of the elements of the improved saw of this invention.

Figure 3 is a view taken along lines 3—3 of Figure 1, showing the clamp fastening a saw blade to a frame.

Figure 4:
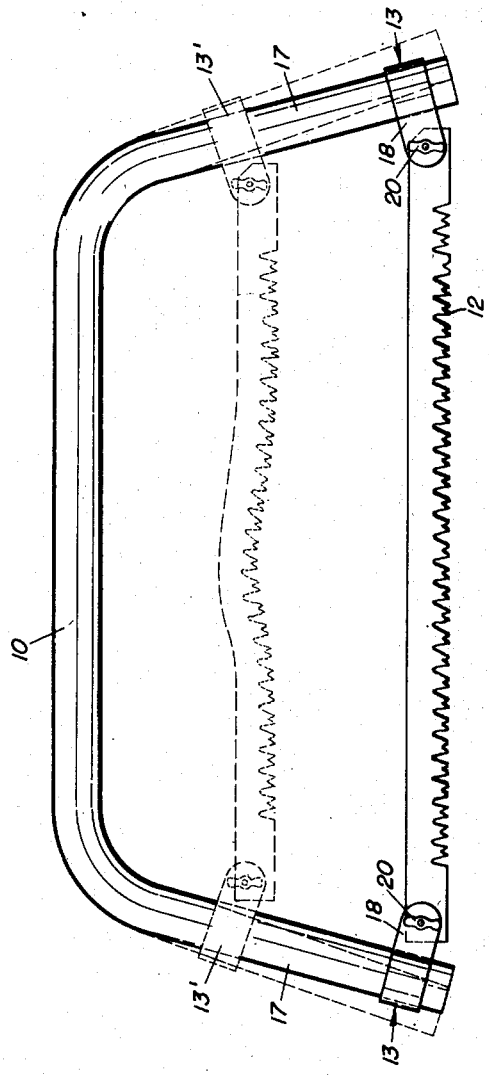
Figure 4 is a side elevation of another embodiment of the invention.
Figure 2:
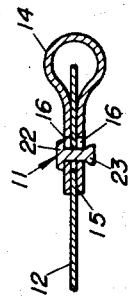
Figure 2 is a section taken along the lines 2—2 of Figure 1, showing a chamfered pin connecting a saw blade to a saw frame.

Referring again to the drawings, Figure 1 illustrates a preferred embodiment of this invention including a saw frame 10, a connecting pin 11, which is used to fasten one end of a saw blade 12 to the frame, and a clamp 13 to connect the free end of the saw blade to the frame.

The tubular frame 10 is approximately bow-shaped and flexible. One end 14 may be flattened and a slot 15 cut on the inside edge. A hole 16 is drilled through the flattened portion.

The connecting pin 11 consists of a head 22 larger in diameter than the holes 16 in the flattened portion 14 of the saw frame 10. The shank 23 which is shown in the drawing as chamfered, is so dimensioned that the widest portion will pass through the holes 16. The use of a chamfered pin is desirable in combination with the clamp so that when tension is applied to the saw blade, the flattened portion of the frame will be forced in firm contact with the saw blade. Removal of the pin is also facilitated by the chamfer. However, the scope of the invention is not to be limited to the use of a particular shape of pin.

The saw blade 12 of the type used in a pulpwood or buck saw, is provided with a hole at each end for mounting the saw blade to the frame.

The clamp 13 is designed to fit around the saw frame 10 and slide along arm 17. Flanges 18 extend from one side of the clamp. Through the center of the flanges 18 a hole is drilled. A screw 19, washer 21, and wing nut 20 may be used to fasten the saw blade to the clamp and to tighten the clamp around the frame arm 17, so as to prevent the clamp from sliding on the frame while the saw is in use. Of course, any similar fastening for the clamp may be used, such as a nut and bolt, or screw engaging threads in one of the flanges.

To assemble the saw of the embodiment shown in Figure 1, one end of the blade 12 is passed through the slot 15 between the sides of the flattened end 14 of the saw frame 10 until the holes in the frame and saw blade 16 coincide. The connecting pin 11 is inserted through the holes. As the blade is tightened the shank 23 of the pin is pressed firmly against the side of the holes 16 and the chamfer holds the frame 14 firmly in contact with the blade 12 and the head of the pin 22. The clamp 13 is fitted onto the tubular arm 17 of the saw frame 10 and moved along the frame to position 13' so that the free end of the saw blade 12 may be easily placed in such a position between the flanges 18 of the clamp 13 that the holes in the clamp and saw blade will coincide. The screw 19 is then inserted through the holes and secured by the washer 21 and wing nut 20 or similar fastening.

An alternative method of assembling the saw comprises fastening the saw blade 12 to the clamp 13 and sliding the clamp onto the tubular arm 17 of the saw frame 10 to the position shown by 13'. The free end of the saw blade is then placed between the sides of the flattened end 14 of the saw frame, passing through the slots 15 so that the holes 16 coincide. The connecting pin 11 is then inserted through the holes.

To adjust the saw for use the clamp 13 is moved toward the end of arm 17 of the saw frame 10, thereby springing the frame, and tightened by the wing nut 20 in a position to hold the blade in tension.

To release tension on the saw blade 12, or to disassemble the saw, the wing nut 20 is loosened and the clamp 13 is moved along the arm 17 of the saw frame 20 toward the position 13'.

In the embodiment of the invention shown in Figure 4, both arms 17—17 of the saw frame 10 are tubular. An adjustable clamp 13 is fitted onto each of the saw frame arms, and both of the clamps are moved up to position 13'—13'. The saw blade 12 is fitted between the flanges 18 of the clamps and fastened with screws 19, washers 21, and wing nuts 20, or similar fastenings. The clamps are then moved towards the ends of the frame arms 17, springing the arms to hold the blade in tensions, and the wing nuts 20 are tightened. By use of the clamps on each end, the arms of the frame can be made more nearly parallel, thereby providing a better grip on the saw frame when in use and also to provide less tendency for the blade clamps to slide toward position 13'—13' while the saw is in use.

It will be seen that the present invention provides for rapid and easy changing of saw blades by providing that such blades be attached to the saw frame by a clamp which permits ready assembly and disassembly without requiring any particular mechanical skill or physical strength.

It will be understood that modifications may be made in the design and arrangement of the parts without departing from the scope of this invention, which is intended to be limited only as required by the following claim.

What is claimed is:

In a saw provided with a substantially bow-shaped flexible tubular frame terminating in two diverging arms, and a saw blade of a length adapted to be connected to opposite outer ends of said bow-shaped frame when said frame is in a compressed, flexed position with means for attaching one end of the saw blade to one of the arms, a clamp slidably mounted on the other arm, said clamp having a frame-encircling portion and two substantially parallel extending flange members extending therefrom and adapted to engage therebetween said saw blade, and a fastening member connecting said flanges and said saw blade and adapted to press said flanges toward each other on either side of said saw blade, the frame-encircling portion of said clamp having an internal diameter which, when said flanges are pressed tightly on either side of said saw blade, is less than the external diameter of said tubular frame portion encircled thereby.

HENRY E. HULL.

References Cited in the file of this patent

UNITED STATES PATENTS

| Number | Name | Date |
|---|---|---|
| 1,540,201 | Valtz | June 2, 1925 |
| 2,089,105 | Anderson | Aug. 3, 1937 |

FOREIGN PATENTS

| Number | Country | Date |
|---|---|---|
| 19,905 | Great Britain | of 1903 |
| 39,090 | Norway | June 16, 1924 |
| 96,936 | Sweden | Sept. 26, 1939 |